US009038912B2

(12) United States Patent
Kasperkiewicz et al.

(10) Patent No.: US 9,038,912 B2
(45) Date of Patent: May 26, 2015

(54) TRADE CARD SERVICES

(75) Inventors: Tomasz Kasperkiewicz, Redmond, WA (US); Blaise Aguera y Arcas, Seattle, WA (US); Brett D. Brewer, Sammamish, WA (US); Steven Drucker, Bellevue, WA (US); Karim Farouki, Seattle, WA (US); Gary W. Flake, Bellevue, WA (US); Stephen L. Lawler, Redmond, WA (US); Donald James Lindsay, Mountain View, CA (US); Adam Sheppard, Seattle, WA (US); Richard Stephen Szeliski, Bellevue, WA (US); Jeffrey Jon Weir, Seattle, WA (US); Julio Estrada, Medina, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 11/958,616

(22) Filed: Dec. 18, 2007

(65) Prior Publication Data

US 2009/0152341 A1 Jun. 18, 2009

(51) Int. Cl.
*G06K 19/06* (2006.01)
*G06F 17/30* (2006.01)
*G06Q 30/02* (2012.01)

(52) U.S. Cl.
CPC .......... *G06F 17/30861* (2013.01); *G06Q 30/02* (2013.01)

(58) Field of Classification Search
USPC ............................ 235/375, 492, 487; 345/428
See application file for complete search history.

(56) References Cited

U.S. PATENT DOCUMENTS

| 4,736,308 | A  | 4/1988  | Heckel        |
|-----------|----|---------|---------------|
| 5,095,798 | A  | 3/1992  | Okada et al.  |
| 5,640,565 | A  | 6/1997  | Dickinson     |
| 5,909,217 | A  | 6/1999  | Bereiter      |
| 5,979,097 | A  | 11/1999 | Moore         |
| 6,128,599 | A  | 10/2000 | Walker et al. |
| 6,200,216 | B1 | 3/2001  | Peppel        |
| 6,473,760 | B1 | 10/2002 | Klatt et al.  |
| 6,591,250 | B1 | 7/2003  | Johnson et al.|

(Continued)

FOREIGN PATENT DOCUMENTS

| JP | 2003-331050 A | 11/2003 |
| JP | 2003331050 A  | 11/2003 |

(Continued)

OTHER PUBLICATIONS

European Office Action dated Jul. 15, 2011 for European Application No. 08863453.0, 9 pages.

(Continued)

*Primary Examiner* — Michael G Lee
*Assistant Examiner* — Tabitha Chedekel
(74) *Attorney, Agent, or Firm* — The Law Office of Michael Kondoudis

(57) ABSTRACT

The claimed subject matter provides a system and/or a method that facilitates servicing a portion of a trade card via a web service. A web service can provide a portion of data to enhance a trade card, wherein the portion of data is at least one of a portion of trade card document-specific data, an intelligent gadget, or a feed driven component. A build component can leverage the web service to utilize the portion of data with the trade card.

25 Claims, 10 Drawing Sheets

(56) References Cited

U.S. PATENT DOCUMENTS

| | | | |
|---|---|---|---|
| 6,612,501 B1 | 9/2003 | Woll et al. | |
| 6,848,997 B1 | 2/2005 | Hashimoto et al. | |
| 6,859,192 B1 * | 2/2005 | Ogawa | 345/77 |
| 6,883,000 B1 * | 4/2005 | Gropper | 1/1 |
| 7,003,546 B1 * | 2/2006 | Cheah et al. | 709/200 |
| 7,042,455 B2 | 5/2006 | Arcas | |
| 7,075,535 B2 | 7/2006 | Aguera y Arcas | |
| 7,133,054 B2 | 11/2006 | Aguera y Arcas | |
| 7,440,746 B1 * | 10/2008 | Swan | 455/412.1 |
| 2002/0032696 A1 | 3/2002 | Takiguchi et al. | |
| 2002/0042744 A1 | 4/2002 | Kohl | |
| 2003/0004887 A1 | 1/2003 | Roszak | |
| 2003/0061097 A1 | 3/2003 | Walker et al. | |
| 2003/0178482 A1 * | 9/2003 | Kisliakov | 235/380 |
| 2004/0006743 A1 * | 1/2004 | Oikawa et al. | 715/513 |
| 2005/0055306 A1 | 3/2005 | Miller et al. | |
| 2005/0068342 A1 | 3/2005 | Ouchi et al. | |
| 2005/0177783 A1 | 8/2005 | Agrawala et al. | |
| 2005/0270288 A1 | 12/2005 | Arcas | |
| 2006/0005146 A1 | 1/2006 | Arcas | |
| 2006/0038823 A1 | 2/2006 | Arcas | |
| 2006/0113378 A1 * | 6/2006 | Wilcox et al. | 235/380 |
| 2006/0168544 A1 * | 7/2006 | Zaner et al. | 715/836 |
| 2006/0176305 A1 | 8/2006 | Arcas | |
| 2006/0212805 A1 | 9/2006 | Allen et al. | |
| 2006/0235941 A1 | 10/2006 | Arcas | |
| 2006/0293904 A1 | 12/2006 | Ramanathan et al. | |
| 2007/0147892 A1 | 6/2007 | Tomatsu et al. | |
| 2008/0034316 A1 | 2/2008 | Thoresson | |
| 2008/0235276 A1 * | 9/2008 | Erol et al. | 707/104.1 |
| 2009/0054124 A1 * | 2/2009 | Robbers et al. | 463/9 |
| 2009/0254820 A1 | 10/2009 | Farouki et al. | |
| 2009/0254867 A1 | 10/2009 | Farouki et al. | |
| 2009/0276445 A1 | 11/2009 | Flake et al. | |
| 2009/0289937 A1 | 11/2009 | Flake et al. | |
| 2009/0303253 A1 | 12/2009 | Flake et al. | |

FOREIGN PATENT DOCUMENTS

| | | | |
|---|---|---|---|
| JP | 2003-345717 A | 12/2003 | |
| JP | 2003345717 A | 12/2003 | |
| KR | 20020004379 A | 1/2002 | |
| TW | I285817 B | 8/2007 | |
| WO | 0143032 A1 | 6/2001 | |
| WO | 2007058743 A1 | 5/2007 | |
| WO | WO 2007/058743 A1 | 5/2007 | |
| WO | 2009082589 A3 | 7/2009 | |

OTHER PUBLICATIONS

Chinese Office Action dated Jul. 19, 2011 for Chinese Application No. 200880122198.3, 6 pages.
OA dated May 14, 2009 for U.S. Appl. No. 11/962,700, 21 pages.
OA dated Dec. 1, 2009 for U.S. Appl. No. 11/962,700, 17 pages.
Notification of Reason for Rejection received in co-pending Japanese Application No. 2010-539583 dated Nov. 12, 2012.
International Search Report dated Jul. 17, 2009 for PCT Application Serial No. 2008/084664, 2 pages.
European Search Report dated Nov. 16, 2010 for European Patent Application No. EP08 863453, pp. 10.
Williams, Lance. "Pyramidal Parametrics." Computer Graphics, vol. 17, No. 3. Jul. 1983. pp. 1-11.
European Office Action dated Jul. 15, 2011 for European Application No. 08863453.0, pp. 9.
Chinese Office Action dated Jul. 19, 2011 for Chinese Application No. 200880122198.3. pp. 6.
International Search Report, Filed Date Nov. 25, 2008, Application No. PCT/US2008/084664, pp. 1-11.
"International Search Report", Filed Date Nov. 25, 2008, Application No. PCT/US2008/084664, pp. 1-11.
OA dated Jun. 25, 2010 for U.S. Appl. No. 11/962,700, 20 pages.
Williams, Lance. "Pyramidal Parametrics." Computer Graphics, vol. 17, No. 3, Jul. 1983. pp. 1-11.
OA dated Jun. 9, 2011 for U.S. Appl. No. 11/966,525, 21 pages.
OA dated Dec. 22, 2010 for U.S. Appl. No. 11/966,525, 10 pages.
European Search Report dated Nov. 16, 2010 for European Patent Application No. EP 08 86 3453, 10 pages.
Japanese Office Action received in JP Application No. 2010-539583 dated Sep. 20, 2013, including English language translation.
"Search Report and Office Action Received in Taiwan Patent Application No. 97144511", Mailed Date: Mar. 11, 2014, Filed Date: Nov. 18, 2008, 13 Pages.

* cited by examiner

TRADE CARD SERVICES

CROSS REFERENCE TO RELATED APPLICATION(S)

This application relates to U.S. patent application Ser. No. 11/962,700 filed on Dec. 21, 2007, entitled "USER-CREATED TRADE CARDS," and U.S. patent application Ser. No. 11/966,525 filed on Dec. 28, 2007, entitled "MULTI-SCALED TRADE CARDS." The entireties of such applications are incorporated herein by reference.

BACKGROUND

Technological advances in computer hardware, software and networking have led to efficient, cost effective computing systems (e.g., desktop computers, laptops, handhelds, cell phones, servers . . .) that can communicate with each other from essentially anywhere in the world in order to exchange information. These systems continue to evolve into more reliable, robust and user-friendly systems. As a consequence, more and more industries and consumers are purchasing computers and utilizing them as viable electronic alternatives to traditional paper and verbal media for exchanging information. For example, many industries and consumers are leveraging computing technology to improve efficiency and decrease cost through web-based (e.g., on-line) services. For instance, consumers can search and retrieve particular information (e.g., via a search engine), purchase goods, view bank statements, invoke monetary transactions (e.g., pay a bill on-line), research products and companies, apply for employment, obtain real-time stock quotes, obtain a college degree, obtain news, access entertainment (e.g., video, music, programming), download files and applications, transmit correspondence (e.g., email, chat rooms, etc.), and the like with the click of a mouse.

In light of such technological advances, an immense amount of data can be generated and/or associated with computer hardware, software, and networking With the current trend of being connected and/or available for various communications with electronic devices (e.g., mobile devices, personal computers, etc.) there can be a generous amount of data associated and utilized therewith. In general, the presentation and organization of data (e.g., the Internet, local data, remote data, websites, etc.) correlates to an enjoyable browsing experience for users. For instance, a website with data aesthetically placed and organized tends to have increased traffic in comparison to a website with data chaotically or randomly displayed. Moreover, interaction capabilities with data can influence a browsing experience. For example, typical browsing or viewing data is dependent upon a defined rigid space and real estate (e.g., a display screen) with limited interaction such as selecting, clicking, scrolling, and the like.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate accessing a portion of a web service that can enhance a portion of a trade card. In general, a web service can be provided that creates trade cards and populates the trade cards with user-defined data (e.g., images, web pages, links, specifications, details, etc.). For example, a user can create a movie trade card (e.g., a distillation of a document that includes document-specific information or data) by harnessing a web service associated with cinema/movies that provides data to hydrate (e.g., add data, populate, etc.) the movie trade card. Moreover, the web services can be domain specific or independent of web service domain. Furthermore, the web service can be accessed utilizing an interface component in which a build component can aggregate data from the web services in order to enhance or create a trade card.

In particular, a user can leverage the web services in order to add data, such as images, static data (e.g., HTML), URLs, links, or any other suitable data. In one example, the web services can provide intelligent gadgets (e.g., gadgets running in a sandbox, etc.) or feed driven components. The intelligent gadgets can be applets or portions of software that provide functionality or capabilities to the trade card. In addition, the web service can provide at least one of the following tools or features to utilize in connection with the trade card 108: 1) authoring; 2) data incorporation/selection; 3) cloud accessibility; 4) organization; 5) control; 6) sharing; and 7) input and/or plug-in services. In other aspects of the claimed subject matter, methods are provided that facilitate receiving and implementing a portion of a web service for a trade card.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
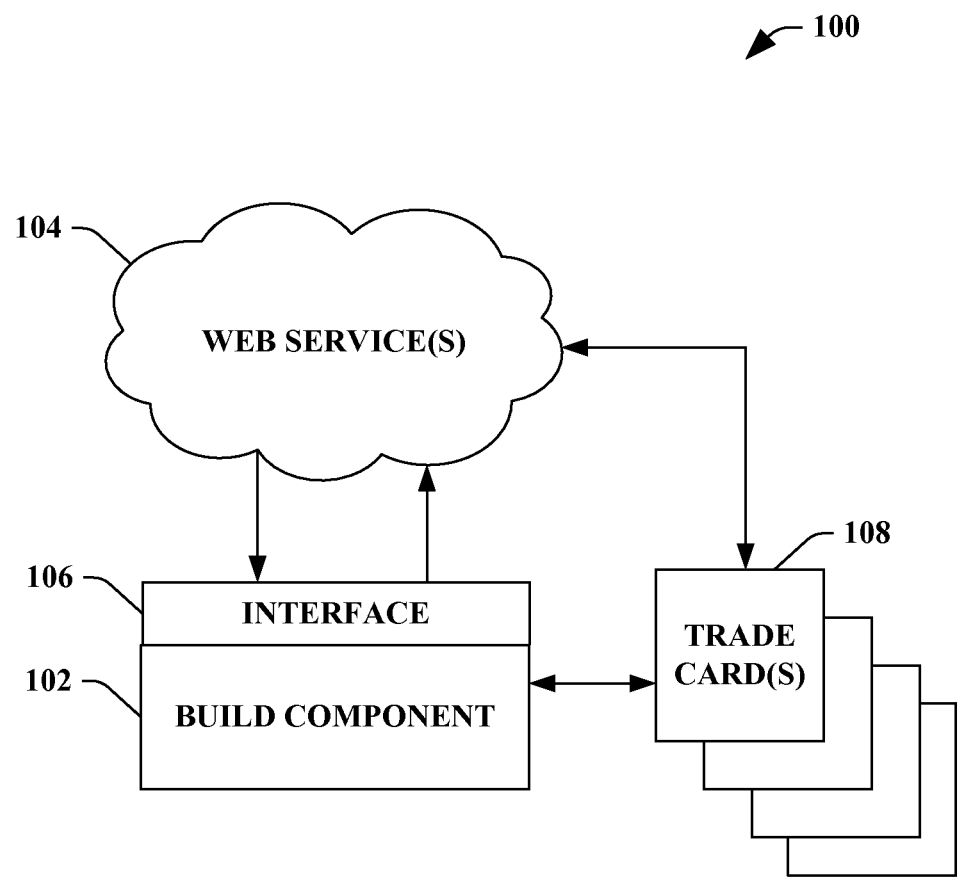
FIG. 1 illustrates a block diagram of an exemplary system that facilitates accessing a portion of a web service that can enhance a portion of a trade card.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "interface," "service," "network," "cloud," "aggregator," and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

It is to be appreciated that the subject innovation can be utilized with at least one of a display engine, a browsing engine, a content aggregator, and/or any suitable combination thereof A "display engine" can refer to a resource (e.g., hardware, software, and/or any combination thereof) that enables seamless panning and/or zooming within an environment in multiple scales, resolutions, and/or levels of detail, wherein detail can be related to a number of pixels dedicated to a particular object or feature that carry unique information. In accordance therewith, the term "resolution" is generally intended to mean a number of pixels assigned to an object, detail, or feature of a displayed image and/or a number of pixels displayed using unique logical image data. Thus, conventional forms of changing resolution that merely assign more or fewer pixels to the same amount of image data can be readily distinguished. Moreover, the display engine can create space volume within the environment based on zooming out from a perspective view or reduce space volume within the environment based on zooming in from a perspective view. Furthermore, a "browsing engine" can refer to a resource (e.g., hardware, software, and/or any suitable combination thereof) that employs seamless panning and/or zooming at multiple scales with various resolutions for data associated with an environment, wherein the environment is at least one of the Internet, a network, a server, a website, a web page, and/or a portion of the Internet (e.g., data, audio, video, text, image, etc.). Additionally, a "content aggregator" can collect two-dimensional data (e.g., media data, images, video, photographs, metadata, etc.) to create a three dimensional (3D) virtual environment that can be explored (e.g., browsing, viewing, and/or roaming such content and each perspective of the collected content).

Now turning to the figures, FIG. 1 illustrates a system 100 that facilitates accessing a portion of a web service that can enhance a portion of a trade card. The system 100 can include a build component 102 that can enhance at least one trade card 108 utilizing at least a portion of a web service 104 via an interface component 106. In other words, the web service 104 can provide various tools or features in order to create and/or manage the trade card 108. It is to be appreciated that there can be any suitable number of trade cards 108 as well as any suitable number of web services 104, wherein a portion of a web service 104 can be utilized to manage or create a portion of a trade card 108. For example, a third-party web site can provide multiple web services, wherein a portion of a web service can enable tools to any suitable portion or section of a trade card such as, but not limited to, authoring, incorporating data, storing, sharing, organization, controlling, input or plug in services, and the like (more description of various services to be described in detail below). Furthermore, the build component 102 can enable the portion of web service 104 to be utilized or employed in connection with the trade card 108. In general, the build component 102 can aggregate data received from the web service 104 in order to incorporate such information or services into the trade card 108.

It is to be appreciated that the trade card 108 can be a summarization of a portion of data. For instance, a trade card can be a summarization of a web page in which the trade card can include key phrases, dominant images, spec information (e.g., price, details, etc.), contact information, etc. Thus, the trade card is a summarization of important, essential, and/or key aspects and/or data of the web page. The trade card 108 can include various views, displays, and/or levels of data in which each can include a respective scale or resolution. It is to be appreciated that such views, displays or levels of data can be utilized with at least one of a zoom (e.g., zoom in, zoom out, etc.) or pan (e.g., pan left, pan right, pan up, pan down, any suitable combination thereof, etc.). Thus, a portion of a trade card can include a first view at a high resolution and a zoom in can reveal additional data at a disparate view and a disparate resolution. In other words, the zoom in can display the first view in a more magnified view but also reveal additional information or data. Moreover, it is to be appreciated that the trade card 108 can include any suitable data determined to be essential for the distillation of content (e.g., a document, website, a product, a good, a service, a link, a collection of data that can be browsed, etc.) such as static data, active data, and/or any suitable combination thereof For example, the trade card 108 can include an image, a portion of text, a gadget, an applet, a real time data feed, a portion of video, a portion of audio, a portion of a graphic, etc.

The trade card 108 can further be utilized in any suitable environment, in any suitable platform, on any suitable device, etc. In other words, the trade card 108 can be universally compatible with any suitable environment, platform, device, etc. such as a desktop computer, a component, a machine, a machine with a windows-based operating system, a media device, a portable media player, a cellular device, a portable digital assistant (PDA), a gaming device, a laptop, a web-browsing device regardless of operating system, a gaming console, a portable gaming device, a mobile device, a portion of hardware, a portion of software, a smartphone, a wireless device, a third-party service, etc. In another example, the trade card 108 can display particular information based at least in part upon 1) an environment utilizing such trade card; or 2) a user or machine utilizing the trade card. In other words, the trade card 108 can be granular and include various sections or portions of data, wherein such granularity or portion of data can be displayed based upon a user or machine utilizing such trade card.

For instance, a user can create a trade card representative of a particular service or product, wherein the trade card can be a distillation of product or service specific data. The trade card, for example, can include various data such as important images, specification information (e.g., size, weight, color, material composition, etc.), cost, vendors, make, model, version, and/or any other information the user includes into the trade card. In other words, the trade card can be a summarization of product or service data in which the summarization data is selected by the user. The trade card can further include various links, relationships, and/or affiliations, in which the relationship, links, and/or affiliations can be with at least one of the Internet, a disparate trade card, the network 106, a server, a host, and/or any other suitable environment associated with a trade card.

In addition, the system 100 can include any suitable and/or necessary interface component 106 (herein referred to as "the interface 106"), which provides various adapters, connectors, channels, communication paths, etc. to integrate at least one of the build component 102 or the web service(s) 104 into virtually any operating and/or database system(s) and/or with one another. In addition, the interface 106 can provide various adapters, connectors, channels, communication paths, etc., that provide for interaction with the build component 102, the web service(s) 104, at least one trade card 108, and any other device and/or component associated with the system 100.

Figure 2:
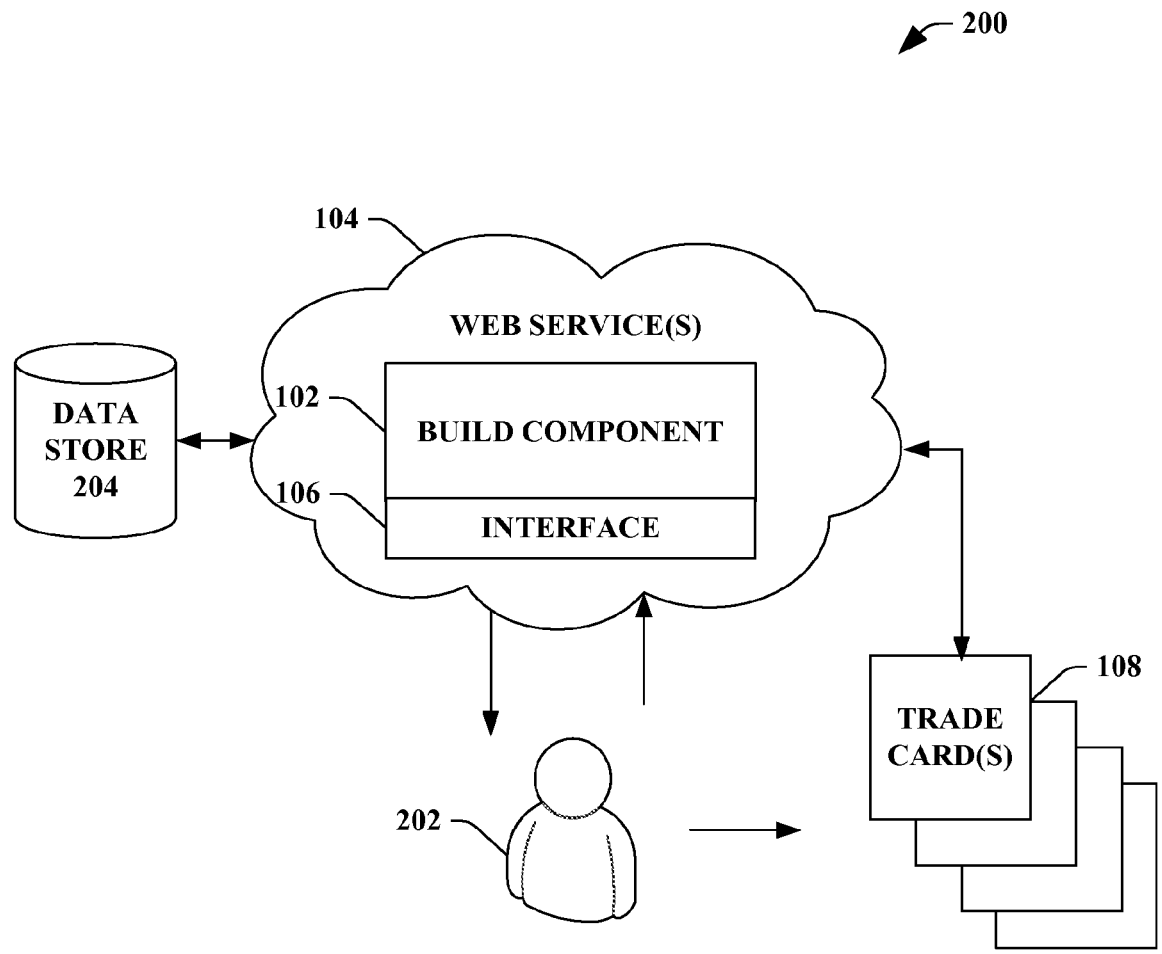
FIG. 2 illustrates a block diagram of an exemplary system that facilitates incorporating data into a portion of a trade card via a web service.

FIG. 2 illustrates a system 200 that facilitates incorporating data into a portion of a trade card via a web service. The system 200 can include a user 202 that can access at least a portion of the web service 104 in order to create or enhance the trade card 108, wherein such access can be provided by the interface 106 and/or the build component 102. The user 202 can be any suitable entity such as, but not limited to, a company, a client, a worker, a group, a web site, a machine, a forum, and/or any suitable entity that can interact with a web service in order to manipulate the trade card 108. For instance, the user 202 can employ the build component 102 in order to identify and/or utilize a portion of a web service 104. Moreover, the user 202 can access at least one of the web service 104, the build component 102, and/or any suitable combination thereof with the interface 106. It is to be appreciated that the web service 104 can provide at least one of the following tools or features to utilize in connection with the trade card 108: 1) authoring; 2) data incorporation/selection; 3) cloud accessibility; 4) organization; 5) control; 6) sharing; and 7) input and/or plug-in services.

For instance, the web service 104 can enable a portion of the trade card 108 to be generated or created. The web service 104 can provide a portion of schema that can create the trade card 108 automatically, semi-automatically, and/or any suitable combination thereof. Moreover, the portion of schema or the web service 104 can create the trade card 108 in an independent manner in that the trade card is independent of the service or site that the trade card is targeted (e.g., device, blog, photo site, auction, review, online store, etc.). For example, a trade card can be automatically created in which it can be universally compatible for a mobile device as well as a desktop machine. Generally, the web service 104 can employ a portion of schema to create a trade card representative of a summarization or distillation of data. The distillation or summarization of data can be for any suitable content such as, but not limited to, a document, an item, a website, a good, a service, a user, a network, a company, an enterprise, a home, a group of users, etc.

Moreover, it is to be appreciated that the portion of schema provided by the web service 104 can generate the trade card 108 with various features and/or settings (e.g., offline, online, any suitable combination thereof). In general, the schema can provide automatic or semi-automatic assistance (with or without user-review) for at least one of aesthetic characteristics (e.g., layout, font, size, format, etc.), populated data (e.g., graphics, imagery, video, audio, web links, websites, editorial experiences, expansion data, etc.), resolution data (e.g., scale and corresponding resolution, available views, etc.), relationships (e.g., direct links, indirect links, etc.), security settings (e.g., permissions for viewing, etc.), display settings (e.g., configuration for data to display based on target or host environment, display settings for portion of a trade card based on user or machine utilizing such trade card, etc.), syndication data (e.g., syndicating a portion of the trade card as a web publication, etc.), available data to include with a trade card (e.g., a portion of a graphic, a portion of audio, a portion of video, a portion of text, a web link, a web page, a website, an applet, a gadget, a real time feed, etc.), spec information, sources, host location, and/or any other suitable data associated with creating a trade card as discussed in the subject innovation. In another example, a portion of content or data can be selected by the user 202 in which the web service 104 can create a trade card in an optimal manner based on such content received. Thus, the web service 104 can provide an optimized or standardized trade card based on the type of content collected or selected by the user 202.

Moreover, the web service 104 can provide available or potential data that can be included or incorporated with a portion of the trade card 108. For instance, a data store 204 (discussed below) can provide data or available content for the trade card 108. In general, the web service 104 can enable a user to "clip" or identify information or data from networks, websites, servers, forums, links, email, communications (e.g., chat room, messenger applications, etc.), audio, video, etc. to include with the trade card 108. It is to be appreciated that the web service 104 can provide data and incorporate such data seamlessly into a portion of the trade card 108. For instance, a user input (e.g., a click, a selection, a touch screen input, etc.) can capture any information on the web for a trade card. Moreover, a user input can save/subscribe a feed's contents as a portion for a trade card. For example, the user 202 can access the web service 104 via the interface 106 in order to select data to create a trade card. Such data can be identified and a trade card can be created utilizing at least one of the web service 104 or the build component 102. Additionally, it is to be appreciated that the data selected can be incorporated into an existing or already created trade card. In still another example, the web service 104 can allow such data to be incorporated with a particular view or scale associated therewith. In other words, a portion of data can be incorporated into a trade card but a display setting or resolution setting can dictate a view or scale in which the data will be displayed. Thus, a first view can display a collection of data, whereas a disparate view (e.g., zoom, pan, etc.) can display a disparate collection of data.

In another example, the web service 104 can provide intelligent gadgets (e.g., gadgets running in a sandbox, etc.) or feed driven components. The intelligent gadgets can be applets or portions of software that provide functionality or capabilities to the trade card. The feed driven components can include static markup with special tags to trigger events. For instance, the web service can insert a feed driven component to a trade card that pings a server every fifteen (15) minutes for a weather update that is displayed on the trade card.

The system 200 can further include the data store 204 that can include any suitable data related to the build component 102, the web service 104, the interface 106, the trade card 108, etc. It is to be appreciated that the data store 204 can be incorporated into the web service 104, a stand-alone component (as depicted), and/or any suitable combination thereof For example, the data store 204 can include, but not limited to including, a portion of a web service, a web service setting, a trade card, data incorporated into a trade card, available data to include with a trade card (e.g., a portion of a graphic, a portion of audio, a portion of video, a portion of text, a web link, a web page, a website, an applet, a gadget, a real time feed, etc.), a syndication of a trade card (e.g., described in more detail below), search criteria, metadata associated with a trade card, user settings, user configurations, trade card settings or data (e.g., expansion data, editorial experience data, links, host location, security settings, exposure settings, etc.), user log in data, user account information, and/or any other suitable data related to the system 200.

It is to be appreciated that the data store 204 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 204 of the subject systems and methods is intended to comprise, without being limited to, these and any other suitable types of memory. In addition, it is to be appreciated that the data store 204 can be a server, a database, a hard drive, a pen drive, an external hard drive, a portable hard drive, and the like.

Figure 3:
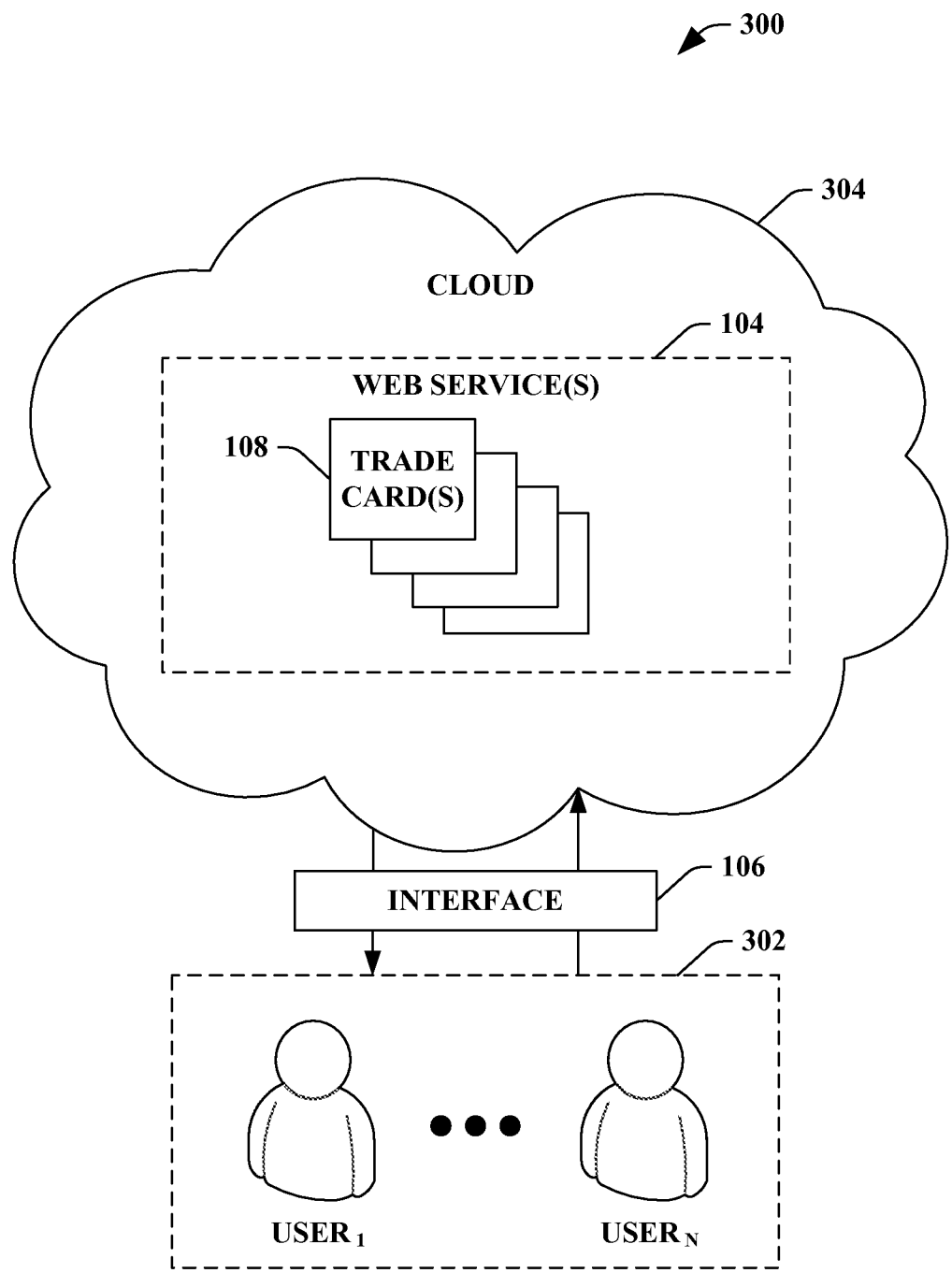
FIG. 3 illustrates a block diagram of an exemplary system that facilitates enabling a plurality of users to seamlessly interact with a portion of a web service related to a trade card.

FIG. 3 illustrates a system 300 that facilitates enabling a plurality of users to seamlessly interact with a portion of a web service related to a trade card. The system 300 can enable a plurality of users 302 to access or interact with at least one of the trade card 108 or the web services 104 via the interface 106. It is to be appreciated that there can be any suitable number of users 302 that can utilize the web service 104 and/or the trade cards 108 such as user I to user N, where N is a positive integer. For example, a first user can access a trade card that he or she created and enhance or edit such trade card utilizing a portion of the web service 104. In addition, a second user can initiate a web service in order to create a trade card representative of a digital camera for sale.

The system 300 can further utilize a cloud 304 that can incorporate at least one of the web service 104, the trade card 108, the build component (not shown), and/or any suitable combination thereof. The cloud 304 can refer to any collection of resources (e.g., hardware, software, combination thereof, etc.) that are maintained by a party (e.g., off-site, on-site, third party, etc.) and accessible by an identified user over a network (e.g., Internet, wireless, LAN, cellular, Wi-Fi, WAN, etc.). The cloud 304 is intended to include any service, network service, cloud service, collection of resources, etc. and can be accessed by an identified user via a network. In addition, the cloud 304 can provide any suitable number of service(s) to any suitable number of user(s) and/or client(s). In particular, the cloud 304 can include resources and/or services that provide a tool or feature for the trade card 108. For instance, a portion of the web service 104 can be incorporated into the cloud 304 which can push and/or pull information (e.g., trade card data, tools related to enhancing a trade card, features to incorporate into a trade card, data to include with a trade card, etc.) to a user, a device, a machine, and/or any other suitable entity. In general, the plurality of users 302 can access at least one trade card 108 or web service 104 within the cloud 304 utilizing the interface 106. By incorporating the web service 104 or the trade card 108 into the cloud 304, a particular user can access or interact with such web service 104 or such trade card 108 independent of the user's physical location, an environment (e.g., server, machine, network, service provider, etc.), platform (e.g., operating system, processor speed, memory, etc.), or device to which the trade card or service is utilized.

For example, a first user can own or author a plurality of trade cards which can be stored in the cloud 304. Upon logging into the cloud 304 with security techniques (e.g., username, passwords, human interactive proofs (HIP), etc.), the cloud 304 can enable the first user to access the trade cards that are owned or authored. Following the example, the cloud 304 can store or host a collection of trade cards owned by a disparate user. It is to be appreciated that the cloud 304 can host or store a plurality of trade cards for numerous users or entities in which the cloud 304 can appropriately identify a user to his or her collection of trade cards. Thus, upon logging into the cloud 304 or being identified within the cloud 304, a trade card can be attached to a user with ownership of such trade card. It is to be appreciated that the trade card, once stored and/or uploaded to the cloud 304 can be separate and independent of potential targets or hosts that may utilize such trade card.

The web service 104 can enable a trade card can be created with an editorial experience. The editorial experience can be any suitable collection of data gathered based upon a creator of the particular trade card. For instance, the editorial experience can be any suitable portion of audio, text, graphic, or video that a creator aggregates in order to portray his or her thoughts related to the created trade card. In one example, a trade card for a product can include an editorial experience that is a video of a creator using such product. In another example, a trade card created by a disparate user for the product can include an editorial experience that is a website for the creator or product. Moreover, the editorial experience can correlate to the particular environment that the trade card is utilized. Thus, a first editorial exposure for a trade card can be employed for a first environment and a second editorial exposure for the trade card can be employed in a second environment.

As discussed, a user can access the web service 104 in order to enable a portion of the trade card to be exposed or displayed based at least in part upon the environment in which the trade card is utilized. For example, a portion of the trade card can be viewable or usable on a mobile device, wherein such portion may not be available on a laptop device. In addition, the web service 104 can provide various security settings to be employed for the trade card 108. In other words, a portion of a trade card can be accessible to a close friend but not a stranger. Such exposure and/or security settings can be manipulated or edited by a portion of the web service 104.

The web service 104 can enable a user to provide syndication for a portion of a trade card 108. The syndication can allow a portion of a trade card to be syndicated (e.g., web syndication, etc.). For instance, web syndication can be a web feed to various entities such as, but not limited to, a website, a disparate trade card, a network, a server, a user, a web address, an email address, a device (e.g., mobile device, gaming device, etc.), and/or any other suitable host or environment that can utilize a portion of the trade card. In addition, the web service 104 can be utilized by a user to configure syndication details or settings. Moreover, the syndication can be a granular-type syndication, wherein portions of the trade card 108 can be utilized for syndication.

Figure 4:
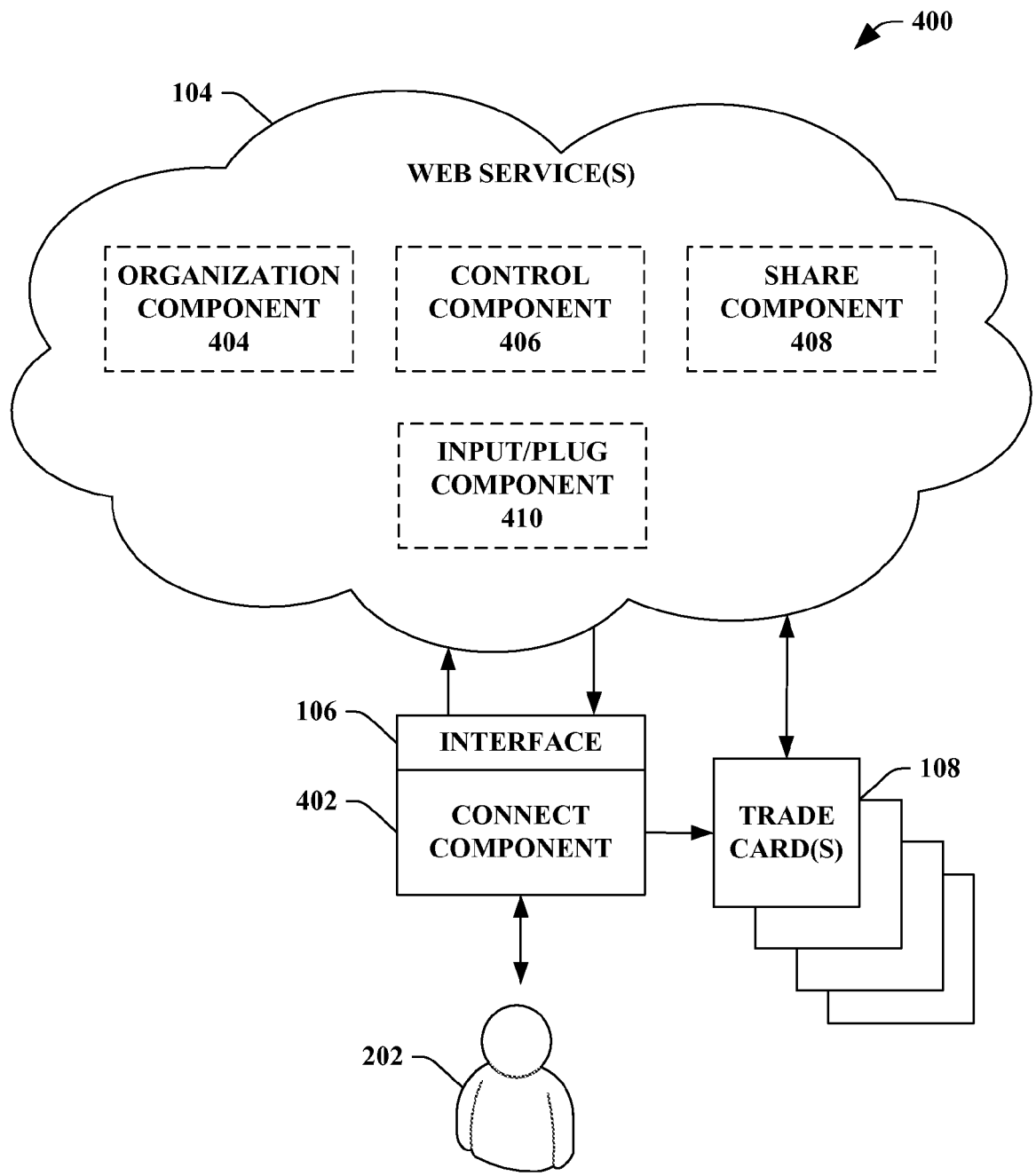
FIG. 4 illustrates a block diagram of an exemplary system that facilitates receiving a portion of a web service for a trade card.

FIG. 4 illustrates a system 400 that facilitates receiving a portion of a web service for a trade card. The system 400 can include the user 202 that can interact or communicate with at least one web service 104 with a connect component 402 via the interface 106. As discussed, the web service 104 can be utilized to create, enhance, and/or modify at least one trade card 108 or a portion of the trade card 108. The connect component 402 can be utilized to receive or transmit information between the interface 106 and the web service 104. In particular, the connect component 402 can be a browser application, a device, a portion of hardware, a portion of software, a mobile device, a portable media player, a gaming console, a data browsing device, and/or any other suitable machine that can interact with a network, a server, or the Internet.

The web service 104 can include an organization component 404 that can categorize, find, list, sort, filter, and/or pivot at least one trade card 108 in a manner unconstrained by limits of a target host or environment. For example, a group of trade cards can be sorted or filtered based on a particular search criteria received by the user 202. In another example, a hierarchical graph, map, or chart can illustrate user trade cards and specific relationships, wherein such graph, map, or chart can be pivoted or re-arranged based on a criteria defined by a user in order to show various relationships from numerous perspectives. The organization component 404 can additionally allow pivoting and filtering for trade cards based upon people/users, tags, location, and/or time.

The web service 104 can further provide a control component 406 that can allow a user to manipulate, edit, and/or manage an owned or authored trade card. Generally, the trade card 108 can be published, shared, transmitted (e.g., emailed, portable, transferred, etc.), exported, imported, combined, embedded, archived, re-used, and the like by utilizing the control component 406 provided by the web service 104. Moreover, the control component 406 can allow the user 202 to manage a life cycle of at least one trade card 108. In addition, the control component 406 can employ publication and/or syndication techniques to a portion of the trade card 108.

Furthermore, the web service 104 can provide a share component 408 that can allow a portion of a trade card to be shared to at least one of an environment, a device, a user, a community of networked users, a network, a machine, a platform, a server, and the like. For example, a portion of a trade card can be private to a first user but may also be public to a second user. Such security or display settings can be enabled or configured utilizing the web service 104 and/or the share component 408. The share component 408 can further allow such shared portions of trade cards to be vetted or ranked by users, services, third-parties, networks, communities, and the like. For example, a community can be employed in which a peer review for trade cards can be utilized in which such ranking or vetting can be utilized as a search criteria or organizational criteria.

The web service 104 can also implement an input/plug component 410. The input/plug component 410 can enable a portion of the web service 104 to be incorporated or utilized by any suitable component (e.g., software, hardware, and/or any suitable combination thereof) or device (e.g., smartphone, mobile device, browsing component, portable digital assistant (PDA), media player, portable gaming device, etc.). In one example, the input/plug component 410 can crawl or search for content or media in order to create a trade card automatically. Furthermore, the input/plug component 410 can allow compatibility with a browser and/or a search engine. For instance, a query can be received in which the input/plug component 410 can identify trade cards that relate or match the query received. In particular, a query or search typically can locate indexes for pages in relation to the search; yet, the input/plug component 410 can further identify a portion of a trade card that further relates to the search or query. It is to be appreciated that the input/plug component 410 can be universally compatible with any suitable browser, search engine, or website that enables querying or searching.

Figure 5:
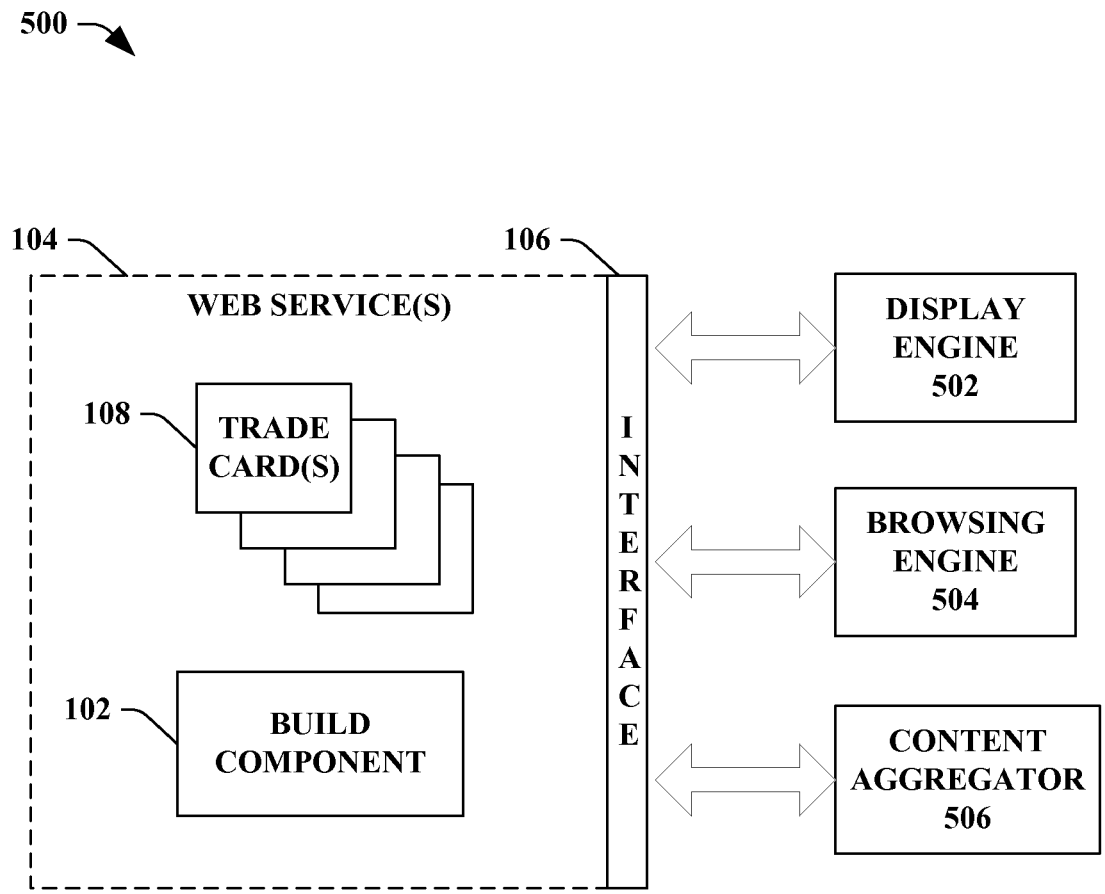
FIG. 5 illustrates a block diagram of exemplary system that facilitates enhancing implementation of a trade card with a display technique, a browse technique, and/or a virtual environment technique.

FIG. 5 illustrates a system 500 that facilities enhancing implementation of a trade card with a display technique, a browse technique, and/or a virtual environment technique. The system 500 can include the build component 102, the web service 104, the interface 106, and/or the trade cards 108. The system 500 can further include a display engine 502 that enables seamless pan and/or zoom interaction with any suitable displayed data (e.g., a trade card), wherein such data can include multiple scales or views and one or more resolutions associated therewith. In other words, the display engine 502 can manipulate an initial default view for displayed data by enabling zooming (e.g., zoom in, zoom out, etc.) and/or panning (e.g., pan up, pan down, pan right, pan left, etc.) in which such zoomed or panned views can include various resolution qualities. The display engine 502 enables visual information to be smoothly browsed regardless of the amount of data involved or bandwidth of a network. Moreover, the display engine 502 can be employed with any suitable display or screen (e.g., portable device, cellular device, monitor, plasma television, etc.). The display engine 502 can further provide at least one of the following benefits or enhancements: 1) speed of navigation can be independent of size or number of objects (e.g., data); 2) performance can depend on a ratio of bandwidth to pixels on a screen or display; 3) transitions between views can be smooth; and 4) scaling is near perfect and rapid for screens of any resolution.

For example, an image (e.g., a portion of a trade card) can be viewed at a default view with a specific resolution. Yet, the display engine 502 can allow the image to be zoomed and/or panned at multiple views or scales (in comparison to the default view) with various resolutions. Thus, a user can zoom in on a portion of the image to get a magnified view at an equal or higher resolution. By enabling the image to be zoomed and/or panned, the image can include virtually limitless space or volume that can be viewed or explored at various scales, levels, or views with each including one or more resolutions.

In other words, an image can be viewed at a more granular level while maintaining resolution with smooth transitions independent of pan, zoom, etc. Moreover, a first view may not expose portions of information or data on the image until zoomed or panned upon with the display engine 502.

A browsing engine 504 can also be included with the system 500. The browsing engine 504 can leverage the display engine 502 to implement seamless and smooth panning and/or zooming for any suitable data browsed in connection with at least one of the Internet, a network, a server, a website, a web page, and the like. It is to be appreciated that the browsing engine 504 can be a stand-alone component, incorporated into a browser, utilized with in combination with a browser (e.g., legacy browser via patch or firmware update, software, hardware, etc.), and/or any suitable combination thereof. For example, the browsing engine 504 can incorporate Internet browsing capabilities such as seamless panning and/or zooming to an existing browser. For example, the browsing engine 504 can leverage the display engine 502 in order to provide enhanced browsing with seamless zoom and/or pan on a website, wherein various scales or views can be exposed by smooth zooming and/or panning.

The system 500 can further include a content aggregator 506 that can collect a plurality of two dimensional (2D) content (e.g., media data, images, video, photographs, metadata, trade cards, etc.) to create a three dimensional (3D) virtual environment that can be explored (e.g., displaying each image and perspective point). In order to provide a complete 3D environment to a user within the virtual environment, authentic views (e.g., pure views from images) are combined with synthetic views (e.g., interpolations between content such as a blend projected onto the 3D model). For instance, the content aggregator 506 can aggregate a large collection of photos of a place or an object, analyze such photos for similarities, and display such photos in a reconstructed 3D space, depicting how each photo relates to the next. It is to be appreciated that the collected content can be from various locations (e.g., the Internet, local data, remote data, server, network, wirelessly collected data, etc.). For instance, large collections of content (e.g., gigabytes, etc.) can be accessed quickly (e.g., seconds, etc.) in order to view a scene from virtually any angle or perspective. In another example, the content aggregator 506 can identify substantially similar content and zoom in to enlarge and focus on a small detail. The content aggregator 506 can provide at least one of the following: 1) walk or fly through a scene to see content from various angles; 2) seamlessly zoom in or out of content independent of resolution (e.g., megapixels, gigapixels, etc.); 3) locate where content was captured in relation to other content; 4) locate similar content to currently viewed content; and 5) communicate a collection or a particular view of content to an entity (e.g., user, machine, device, component, etc.).

Figure 6:
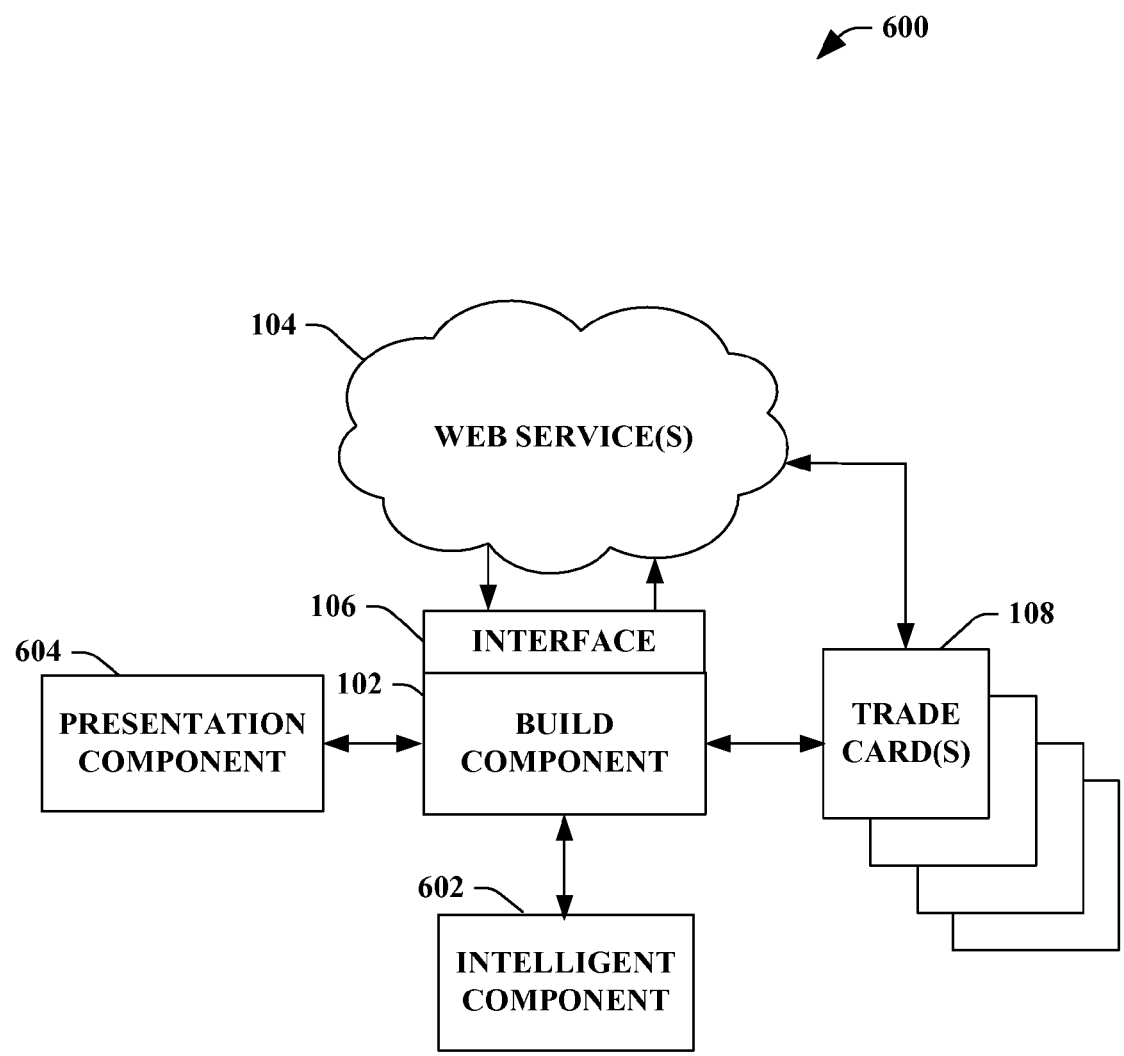
FIG. 6 illustrates a block diagram of an exemplary system that facilitates accessing a portion of a web service that can enhance a portion of a trade card.

FIG. 6 illustrates a system 600 that employs intelligence to facilitate accessing a portion of a web service related to enhancing a portion of a trade card. The system 600 can include the build component 102, the web services 104, the interface 106, and/or the trade card 108. It is to be appreciated that the build component 102, the web services 104, the interface 106, and/or the trade card 108 can be substantially similar to respective components, services, and trade cards described in previous figures. The system 600 further includes an intelligent component 602. The intelligent component 602 can be utilized by at least one of the build component 102 or the web service 104 to facilitate creating and/or manipulating a portion of a trade card. For example, the intelligent component 602 can infer authoring details, clipping data or data to include on a trade card, cloud settings (e.g., security settings, log in settings, etc.), organization preferences for trade card data, control preferences for a specific user and their trade cards, sharing settings, input services/plug-in options, and the like. Moreover, the intelligent component 602 can infer features or characteristics for an automatically or semi-automatically created trade card, a template or type of trade card, a portion of data to incorporate into a trade card, a syndication setting, a exposure setting, a security setting, an exposure setting based on an environment that utilizes the trade card, aesthetic characteristics (e.g., layout, font, size, format, etc.), editorial experiences, resolution data (e.g., scale and corresponding resolution, available views, etc.), display or exposure settings (e.g., configuration for data to display based on target or host environment, display settings for portion of a trade card based on user or machine utilizing such trade card, etc.), control settings, sharing settings, organization settings, input/plug settings, cloud settings, and/or any other data related to the system 600.

The intelligent component 602 can employ value of information (VOI) computation in order to identify suggestions and/or inferred content for a trade card created utilizing a portion of the web service 104. For instance, by utilizing VOI computation, the most ideal and/or appropriate suggestions and/or content can be determined for the trade card. Moreover, it is to be understood that the intelligent component 602 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naive Bayes, Bayesian networks, decision trees, neural networks, fuzzy logic models, and probabilistic classification models providing different patterns of independence can be employed. Classification as used herein also is inclusive of statistical regression that is utilized to develop models of priority.

The build component 102 or the web service 104 can further utilize a presentation component 604 that provides various types of user interfaces to facilitate interaction between a user and any component coupled to at least one of the build component 102 or the web service 104. As depicted, the presentation component 604 is a separate entity that can be utilized with the build component 102 or the web service 104. However, it is to be appreciated that the presentation component 604 and/or similar view components can be incorporated into the build component 102, incorporated into the web services 104, and/or a stand-alone unit. The presentation component 604 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into at least one of the build component 102 or the web services 104.

The user can also interact with the regions to select and provide information via various devices such as a mouse, a roller ball, a touchpad, a keypad, a keyboard, a touch screen, a pen and/or voice activation, a body motion detection, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can then provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, EGA, VGA, SVGA, etc.) with limited graphic support, and/or low bandwidth communication channels.

Figure 7:
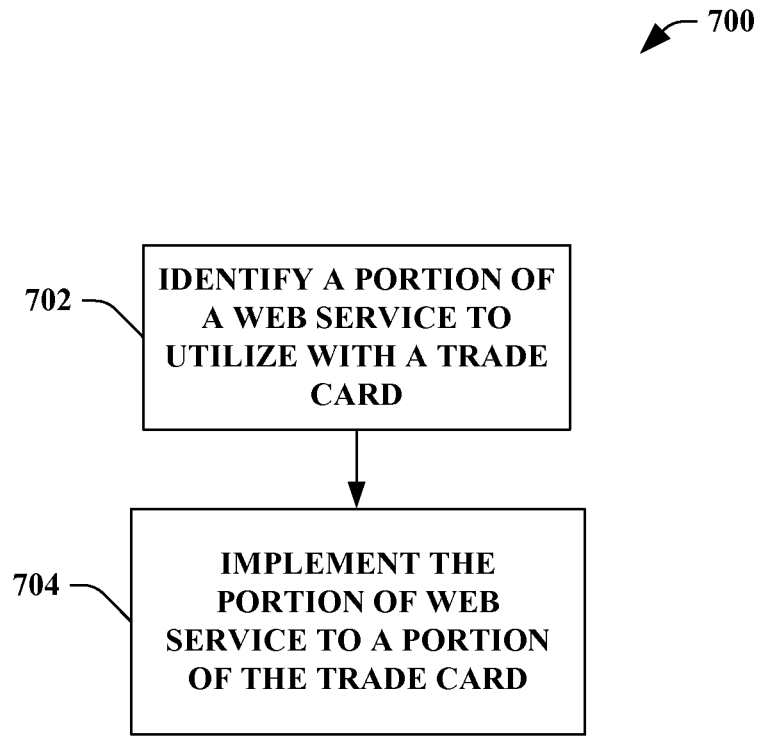
FIG. 7 illustrates an exemplary methodology for receiving a portion of a web service for a trade card.
Figure 8:
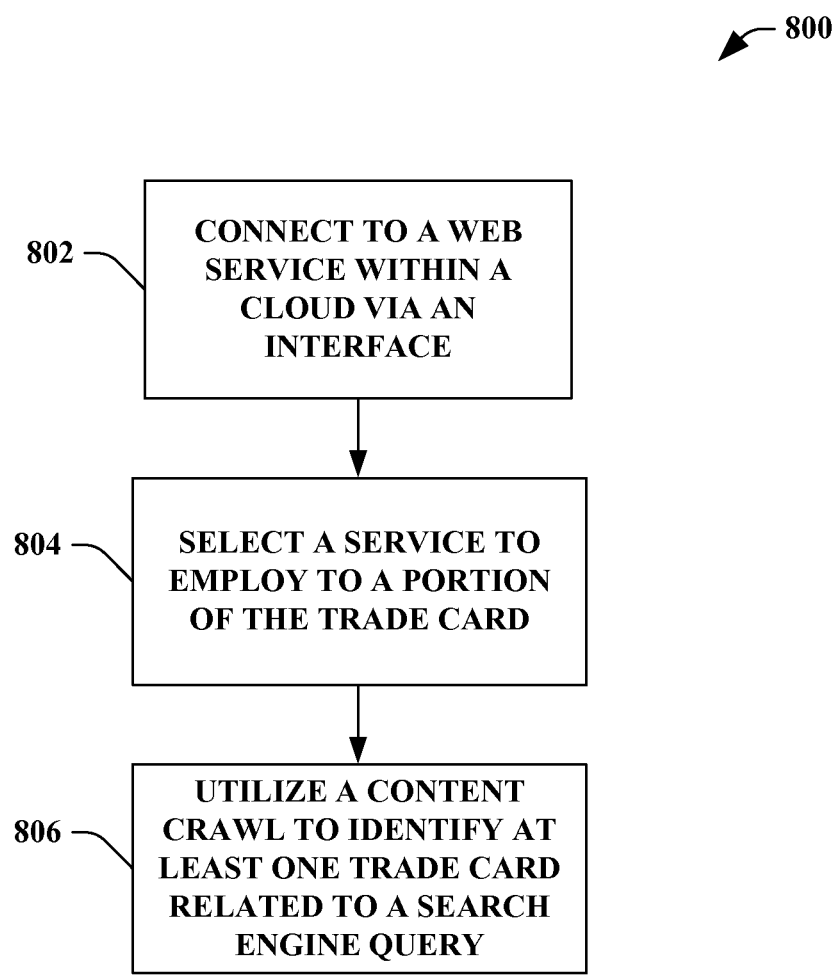
FIG. 8 illustrates an exemplary methodology that facilitates enabling a plurality of users to seamlessly interact with a portion of a web service related to a trade card.

FIGS. 7-8 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts. For example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 7 illustrates a method 700 that facilitates receiving a portion of a web service for a trade card. At reference numeral 702, a portion of a web service to utilize with a trade card is shown. The portion of web service can be provided in order to create or enhance a portion of a trade card. For example, a user can interact or communicate with the web service in order to select a particular web service. It is to be appreciated that the web service can be accessed independent of location or source of the web service. In other words, the web service can be accessed or implemented from any suitable environment whether such environment is local, remote, a server, a network, a cloud service, a third-party service, a website, a forum, a web link, etc.

The trade card can be a summarization of a portion of data, wherein such summarization includes important, essential, and/or key aspects and/or data. For instance, a trade card can be a summary of a web page in which the trade card can include key phrases, dominant images, metadata, spec/product information (e.g., price, details, etc.), contact information, etc. Thus, the trade card is a summarization of important, essential, and/or key aspects and/or data of the web page. Moreover, it is to be appreciated that the trade card can include any suitable data determined to be essential for the distillation of a document or item such as static data, active data, and/or any suitable combination thereof. For example, the trade card can include an image, a gadget, an applet, a real time data feed, etc. The trade card can further be utilized in any suitable environment, in any suitable platform, on any suitable device, etc. In another example, the trade card can include granular layers or views in which a particular portion of data can be displayed based at least in part upon an environment that will display or utilize such trade card. In another example, a particular portion of data on a trade card can be displayed based upon a specific user or machine displaying or utilizing the trade card. Still further, the trade card can include scales or views with respective resolutions in which a particular portion of data can be displayed or revealed based upon the scale or view that is accessed.

At reference numeral 704, the portion of web service can be implemented to a portion of the trade card. In general, upon selection or identification of a portion of a web service, the web service can create, enhance, or manipulate a portion of the trade card. The portion of web service can provide at least one of an authoring of a trade card (e.g., creating or generating a trade card to summarize a collection of data), clipping of data (e.g., data incorporation/selection for a trade card), remote accessibility (e.g., cloud accessibility, remote interaction, etc.), organization of trade cards (e.g., categorize, find, list, sort, filter, pivot, etc.), controlling a trade card (e.g., publishing, transmission, export, import, combining trade cards, combining portions of trade cards, archiving, re-using, deleting, controlling a life-cycle for a trade card, etc.), sharing a trade card (e.g., environment-based sharing, user-based sharing, views or scales with various sharing settings, etc.), providing input or plug-in services (e.g., browser or search engine plug-in that can provide trade card results for a query), syndication, ranking, editorial experiences, etc.

FIG. 8 illustrates a method 800 for optimizing enabling a plurality of users to seamlessly interact with a portion of a web service related to a trade card. At reference numeral 802, a web service within a cloud can be connected to via an interface. For instance, a user can utilize a machine or computing device in order to connect to a cloud or networked service in order to access a web service. As discussed, the cloud can refer to any collection of resources (e.g., hardware, software, combination thereof, etc.) that are maintained by a party (e.g., off-site, on-site, third party, etc.) and accessible by an identified user over a network (e.g., Internet, wireless, LAN, cellular, Wi-Fi, WAN, etc.). Moreover, the cloud can host or include a portion of the web service that relates to creating, manipulating, editing, or enhancing a trade card. It is to be appreciated that the interface can be any suitable software, hardware, or combination thereof that can access at least one of the cloud or the web service.

At reference numeral 804, a service can be selected to employ to a portion of the trade card. For example, upon connecting to a cloud and, in turn, a web service, at least one service can be selected to implement to create or utilize with a trade card. It is to be appreciated that the web service and/or cloud can provide a plurality of web services (e.g., services) directed toward trade cards such as, but not limited to, authoring, data incorporation/selection, cloud accessibility, organization, control, sharing, input and/or plug-in services, syndication, editorial experiences, ranking, etc. Moreover, a user can utilize any suitable portion of a service in connection with a portion or section of a trade card. For instance, a first service can be utilized for a first portion of a trade card and a second service can enhance a second portion of the trade card.

At reference numeral 806, a content crawl can be utilized to identify at least one trade card related to a search engine query. The content crawl can be initiated across one or more trade cards in order to identify data relevant to a received query or search, wherein such content crawl can locate portions of such trade cards that correspond to the query or search. In particular, a query or search typically can locate indexes for pages (e.g., web pages, links, web sites, etc.) in relation to the search; yet, the content crawl can further identify a portion of a trade card that further relates to the search or query. Thus, a search engine search for digital cameras can locate web sites or other links that relate to such search as well as a collection of trade cards that relate to digital cameras.

Figure 9:
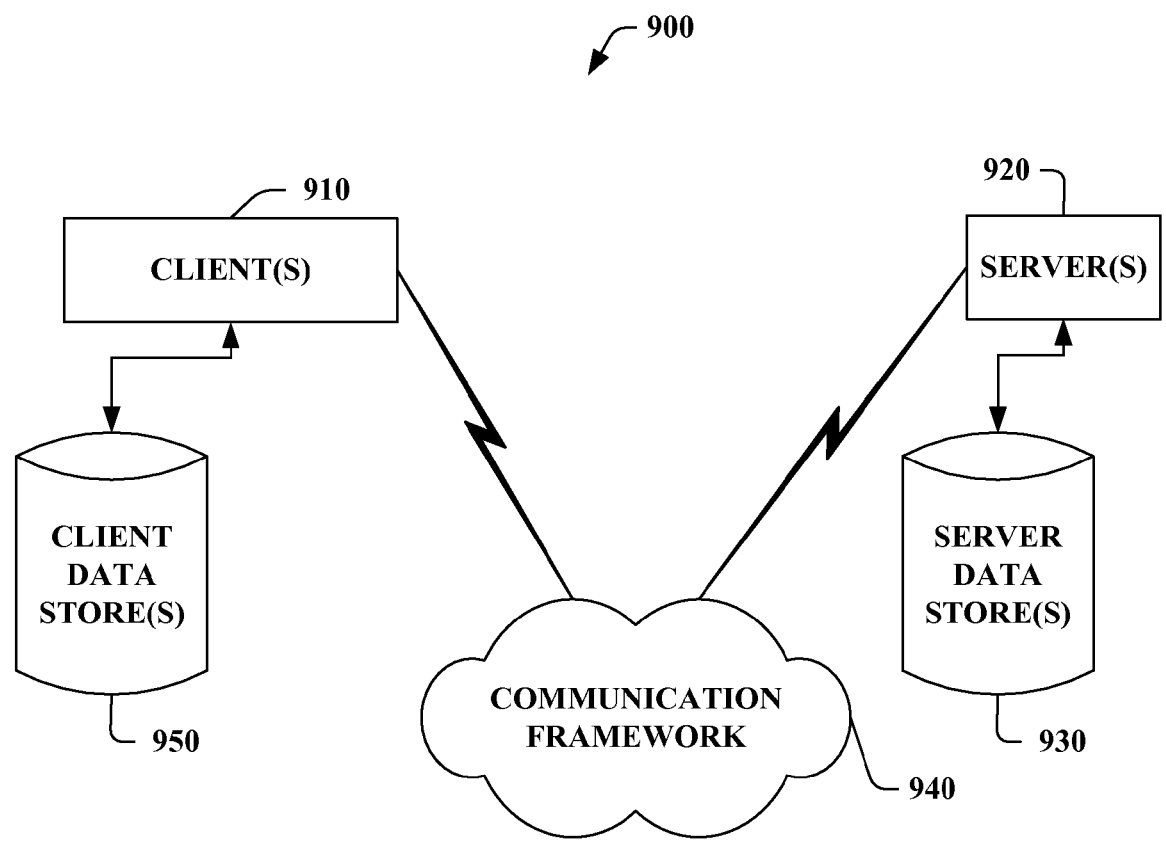
FIG. 9 illustrates an exemplary networking environment, wherein the novel aspects of the claimed subject matter can be employed.
Figure 10:
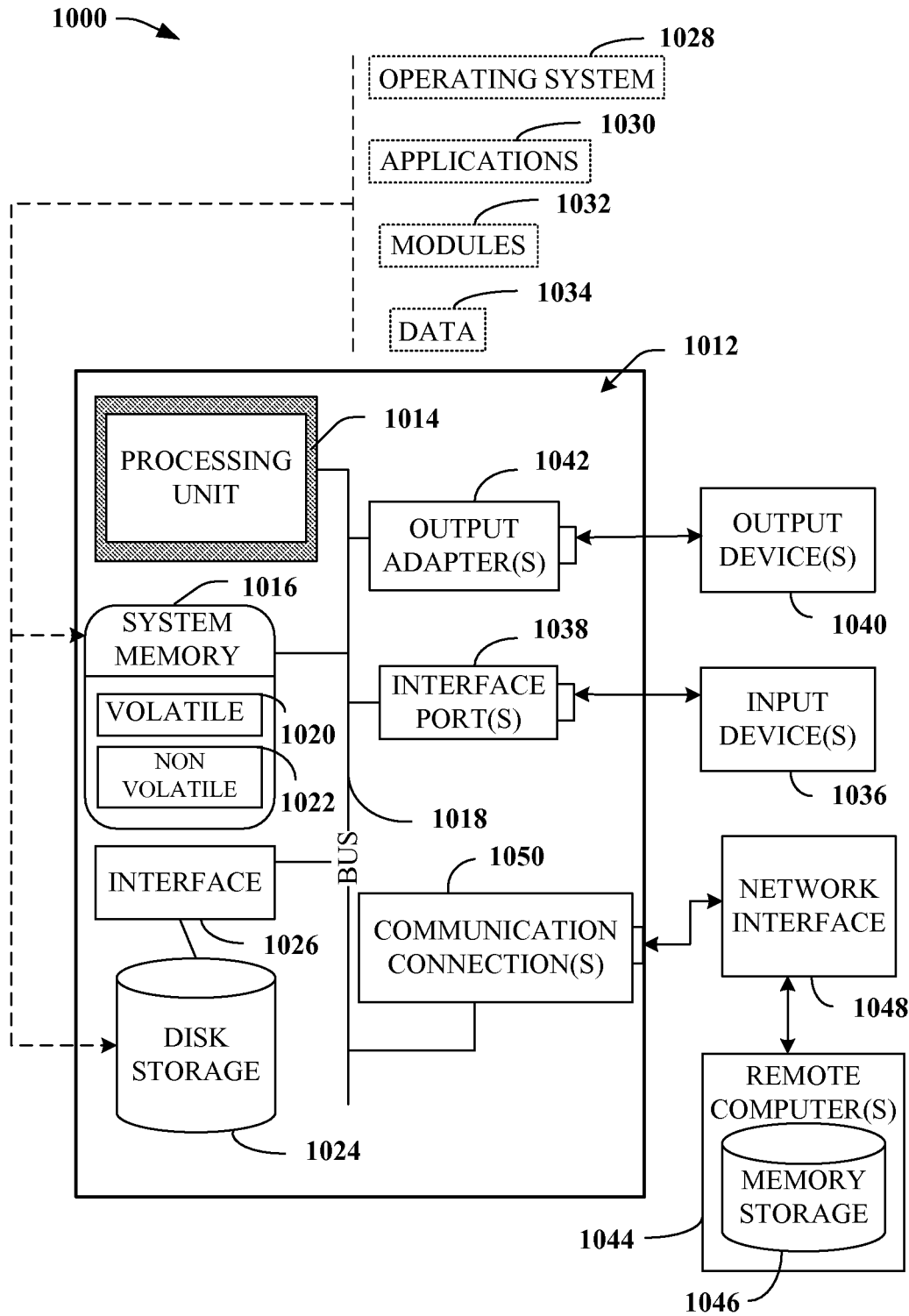
FIG. 10 illustrates an exemplary operating environment that can be employed in accordance with the claimed subject matter.

In order to provide additional context for implementing various aspects of the claimed subject matter, FIGS. 9-10 and the following discussion is intended to provide a brief, general description of a suitable computing environment in which the various aspects of the subject innovation may be implemented. For example, a web service can be accessed and utilized in order to create and/or enhance a trade card, as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 9 is a schematic block diagram of a sample-computing environment 900 with which the claimed subject matter can interact. The system 900 includes one or more client(s) 910. The client(s) 910 can be hardware and/or software (e.g., threads, processes, computing devices). The system 900 also includes one or more server(s) 920. The server(s) 920 can be hardware and/or software (e.g., threads, processes, computing devices). The servers 920 can house threads to perform transformations by employing the subject innovation, for example.

One possible communication between a client 910 and a server 920 can be in the form of a data packet adapted to be transmitted between two or more computer processes. The system 900 includes a communication framework 940 that can be employed to facilitate communications between the client(s) 910 and the server(s) 920. The client(s) 910 are operably connected to one or more client data store(s) 950 that can be employed to store information local to the client(s) 910. Similarly, the server(s) 920 are operably connected to one or more server data store(s) 930 that can be employed to store information local to the servers 920.

With reference to FIG. 10, an exemplary environment 1000 for implementing various aspects of the claimed subject matter includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), or flash memory. Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the claimed subject matter can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereof, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

There are multiple ways of implementing the present innovation, e.g., an appropriate API, tool kit, driver code, operating system, control, standalone or downloadable software object, etc. which enables applications and services to use the advertising techniques of the invention. The claimed subject matter contemplates the use from the standpoint of an API (or other software object), as well as from a software or hardware object that operates according to the advertising techniques in accordance with the invention. Thus, various implementations of the innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other Elements.

What is claimed is:

1. A computer-implemented system, comprising:
   a network-hosted trade card configured to electronically display data;
   a web service
      that facilitates incorporation of build data into the trade card,
      that executes an Internet search for content, and
      that provides previously captured content,
   the build data including (i) content returned in response to the Internet search, (ii) the captured content, (iii) other data necessary to generate the trade card;
      a build component that aggregates the build data and generates the trade card using the aggregated build data, the build component generating the trade card so as to include a collection of data gathered by an owner of the trade card, the collection of information resulting in different editorial experiences that respectively correspond to different environments; and
      an interface through which a user may selectively access the web service and the build component.

2. The computer-implemented system of claim 1, the web service further including a share component configured to provide one of a public or private share status to the trade card, based on a security setting.

3. The computer-implemented system of claim 1, wherein the trade card is configured to incorporate at least one of a portion of a graphic, a portion of audio, a portion of video, a portion of an image, a portion of text, an applet, a gadget, or a real-time data update.

4. The computer-implemented system of claim 1, further comprising a content aggregator configured to identify content similar to currently-displayed content.

5. The computer-implemented system of claim 4, wherein the trade card is configured to be platform-independent.

6. The computer-implemented system of claim 4, wherein the content aggregator is further configured to collect two-dimensional content, analyze the similarities in the two-dimensional content, and display the two-dimensional content in a three-dimensional space that depicts relationships among the two-dimensional content.

7. The computer-implemented system of claim 1, wherein the web service includes at least one of a tool or a feature that interacts with a portion of the trade card.

8. The computer-implemented system of claim 7, wherein the build component is configured to aggregate at least one of the tool or the feature to utilize with at least one portion of the trade card.

9. The computer-implemented system of claim 1, wherein the web service is further configured to provide syndication for at least a portion of the trade card.

10. The computer-implemented system of claim 9, wherein the interface is coupled to a connect component configured to at least one of receive or transmit information exchanged between the interface and web service.

11. The computer-implemented system of claim 1, wherein the build component is configured to be connectable to a network.

12. The computer-implemented system of claim 1, wherein the web service is configured to provide at least one of the following:
   a portion of schema configured to automatically create and populate a portion of the trade card; or
   a clip technique configured to automatically incorporate a portion of identified data into a portion or another portion of the trade card.

13. The computer-implemented system of claim 1, wherein the web service includes at least one of the following:
   an organization component configured to perform at least one of categorizing a portion of a trade card, finding a portion of a trade card, listing a portion of a trade card, sorting one or more trade cards, filtering one or more trade cards or pivoting a hierarchical map of one or more trade cards; or
   a control component configured to manage at least one of trade card publication, a privacy setting for the trade card, transmission of the trade card, export setting for the trade card, an import setting of the trade card, combination of one or more portions of trade cards, data embedding related to the trade card, archiving of the trade card, manipulation of a portion of a life cycle for the trade card, re-use of a trade card, or syndication of the trade card.

14. The computer-implemented system of claim 1, the web service further including an organization component configured to at least one of filter or sort a plurality of trade cards based on selected criteria.

15. The computer-implemented system of claim 1, further comprising a connect component configured to provide information exchange between an interface and the web service, the connect component including at least one of a browser application, a device, a portion of hardware, a portion of software, a mobile device, a portable media player, a gaming console, or a data browsing device.

16. The computer-implemented system of claim 1, wherein the trade card is further configured to display particular data with a granularity dependent on a machine utilizing the trade card.

17. The computer-implemented system of claim 16, wherein the particular data is viewable or not viewable based at least in part on the machine utilizing the trade card.

18. The computer-implemented system of claim 1, wherein the build component builds the trade card using a schema provided by the web service.

19. The computer-implemented system of claim 1, wherein the collection of data includes a portion of audio, text, graphic, or video information.

20. The computer-implemented system of claim 1, wherein, when the trade card is for a product, the collection of data includes a video of use of the product and a website for the product.

21. A computer-implemented method, comprising:
   identifying at least one web service to utilize with a trade card;
   receiving data that is to be incorporated into the trade card from the at least one web service;
   building content automatically in the trade card, via the at least one web service, based on input from an intelligence component configured to infer content to be built in the trade card, the building including adding an editorial experience into the trade card, the editorial experience including a collection of data gathered by an owner of the trade card that portrays the owner's thoughts concerning the built trade card; and accessing the at least one web service to enable a portion of the trade card to be displayed based on an environment in which the trade card is utilized, the portion being viewable in a first environment in which the trade card is utilized and not viewable in a second environment in which the trade card is utilized, the second environment being different from the first.

22. The computer-implemented method of claim 21, further comprising connecting to the at least one web service within a cloud service via an interface.

23. The computer-implemented method of claim 21, further comprising utilizing an interface to receive a request for a portion of the at least one web service.

24. A computer-readable storage medium storing instructions that, when executed by a computing device, cause the computing device to perform operations comprising:

identifying at least one web service to utilize with a trade card;

receiving data that is to be incorporated in the trade card from the at least one web service;

building content automatically into the trade card, via the at least one web service, based on input from an intelligence compnent configured to infer content to be built into the trade card, the building including adding an editorial experience into the trade card, the editorial experience including a collection of data gathered by an owner of the trade card that portrays the owner's thoughts concerning the built trade card; and accessing the at least one web service to enable a portion of the trade card to be displayed based on an environment in which the trade card is utilized, the portion being viewable in a first environment in which the trade card is utilized and not viewable in a second environment in which the trade card is utilized, the second environment being different from the first.

25. A computer-implemented system, comprising:

a network-hosted card configured to electronically display user specified data of a type selected by a user;

a web service that
  (1) facilitates incorporation of build data into the card, the build data including content returned in response to an Internet search, previously captured content, and other data necessary to generate the card,
  (2) executes an Internet search for content, and
  (3) provides previously captured content; and a build component that aggregates the build data and generates the card using the aggregated build data, wherein the user specified data is specified based on at least one of a selection by the user, an electronic search by the user, and at least one inference based on an account of the user.

\* \* \* \* \*